(12) United States Patent
Spadaccini et al.

(10) Patent No.: US 7,231,769 B2
(45) Date of Patent: Jun. 19, 2007

(54) GAS TURBINE COOLING SYSTEM

(75) Inventors: Louis J. Spadaccini, Manchester, CT (US); He Huang, Glastonbury, CT (US); Luca Bertuccioli, East Longmeadow, MA (US); Robert L. Bayt, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/767,582

(22) Filed: Jan. 29, 2004

(65) Prior Publication Data

US 2005/0166598 A1    Aug. 4, 2005

(51) Int. Cl.
*F02C 7/14* (2006.01)
(52) U.S. Cl. ............... 60/782; 60/785; 60/806; 60/736
(58) Field of Classification Search ............ 60/782, 60/785, 806, 728, 736
See application file for complete search history.

(56) References Cited

U.S. PATENT DOCUMENTS

| | | | |
|---|---|---|---|
| 3,751,879 A | 8/1973 | Allington | |
| 5,504,256 A | 4/1996 | Bond et al. | |
| 5,619,855 A * | 4/1997 | Burrus | ............ 60/736 |
| 5,876,604 A | 3/1999 | Nemser et al. | |
| 5,888,275 A | 3/1999 | Hamasaki et al. | |
| 5,992,920 A | 11/1999 | Bailey et al. | |
| 6,253,554 B1 * | 7/2001 | Kobayashi et al. | ............ 60/736 |
| 6,258,154 B1 | 7/2001 | Berndt et al. | |
| 6,315,815 B1 * | 11/2001 | Spadaccini et al. | ............ 95/46 |
| 6,647,730 B2 | 11/2003 | Liu | |
| 6,672,072 B1 * | 1/2004 | Giffin, III | ............ 60/782 |
| 6,709,492 B1 * | 3/2004 | Spadaccini et al. | ............ 96/6 |
| 2004/0194627 A1* | 10/2004 | Huang et al. | ............ 96/6 |
| 2005/0166597 A1* | 8/2005 | Spadaccini et al. | ............ 60/776 |
| 2006/0179845 A1* | 8/2006 | Spadaccini et al. | ............ 60/772 |
| 2007/0006591 A1* | 1/2007 | Spadaccini et al. | ............ 60/772 |

FOREIGN PATENT DOCUMENTS

CN    1221069    6/1999

* cited by examiner

*Primary Examiner*—William H. Rodriguez
(74) *Attorney, Agent, or Firm*—Carlson, Gaskey & Olds

(57) ABSTRACT

A cooling system for a gas turbine engine includes a fuel deoxygenator for increasing the cooling capacity of the fuel. The fuel deoxygenator removes dissolved gases from the fuel to prevent the formation of insoluble deposits. The prevention of insoluble deposits increases the usable cooling capacity of the fuel. The increased cooling capacity of the deoxygenated fuel provides a greater heat sink for cooling air used to protect engine components. The improved cooling capacity of the cooling air provides for increased engine operating temperatures that improves overall engine efficiency.

12 Claims, 3 Drawing Sheets

GAS TURBINE COOLING SYSTEM

BACKGROUND OF THE INVENTION

This invention generally relates to a cooling system for a gas turbine engine, and specifically to a cooling system including a fuel deoxygenator to increase the usable heat absorption capability of fuel used for cooling cooling air.

A gas turbine engine typically includes a compressor, a combustor and a turbine. Air entering the compressor is compressed and directed toward the combustor. In the combustor, fuel is combined with the high-pressure air and ignited. Combustion gases produced in the combustor drive the turbine. High engine temperatures provide better fuel burn rates and engine efficiencies that extend the range of an aircraft. The high engine and combustion gas temperatures are greater than can normally be accommodated by metal parts of the engine. Typically, a portion of air from the compressor is bled off and directed over parts of the engine to form a cooling boundary layer that insulates exposed surfaces from the hot combustion gases.

Cooling the bleed air from the compressor allows the engine to be operated at increased combustion gas temperatures while maintaining the same temperature in engine components. It is known, to use fuel as a cooling medium to cool air from the compressor. The usable cooling capacity of fuel is limited by coke formation caused by oxidative reactions with dissolved oxygen within the fuel. These reactions cause the formation of insoluble materials referred to as "coke" or "coking". Coke deposits can cause degradation of fuel delivery performance. Therefore, the usable cooling capacity of the fuel is limited by the amount of dissolved oxygen within the fuel. Further, the usable cooling capacity of the fuel limits the amount of heat that can be transferred from the engine cooling air, and that in turn limits sustainable engine operating temperatures.

Accordingly, it is desirable to develop an engine cooling system with increased fuel cooling capacity for absorbing greater amounts of heat from cooling air.

SUMMARY OF INVENTION

This invention is an engine cooling system including a fuel deoxygenator for removing dissolved oxygen from fuel to increase the usable cooling capacity of fuel used for cooling engine cooling air.

A gas turbine engine includes a compressor compressing air to a high pressure. The high-pressure air is mixed with fuel in a combustor and ignited to produce hot combustion gases. The hot combustion gases drive a turbine. The turbine is cooled by air bled off from the compressor. The cooling air from the compressor is cooled within a fuel/air heat exchanger. Removing substantially all the dissolved oxygen in the fuel deoxygenator increases the usable cooling capacity of the fuel by increasing the temperature at which coke deposits are formed.

The increased cooling capacity of the fuel enables an increase in the amount of heat that can be absorbed from the cooling air, which in turn enables increased engine operating temperatures. As appreciated, higher engine temperatures result in greater engine efficiencies, that in turn result in favorable performance improvements.

Accordingly, the engine cooling system of this invention increases the usable cooling capacity of fuel used to cool engine cooling air.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
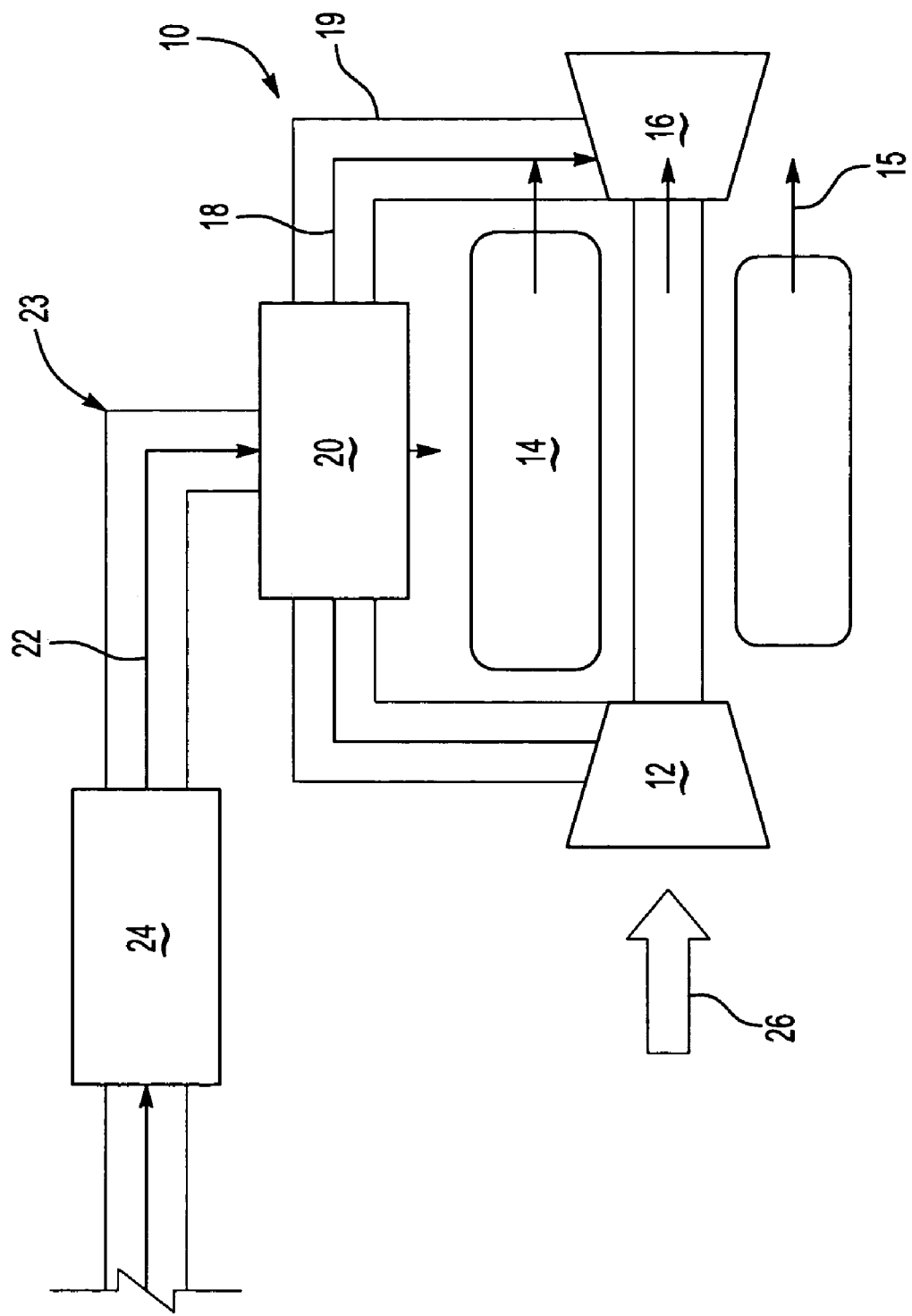
FIG. 1 is a schematic view of a gas turbine engine and cooling air system according to this invention.

Referring to FIG. 1, a gas turbine engine assembly 10 includes a compressor 12 a combustor 14 and a turbine 16. Airflow 26 entering the compressor 12 is compressed to a high pressure and directed towards the combustor 14. In the combustor 14, fuel 22 is mixed with the high-pressure air and ignited. Resulting hot combustion gases 15 are exhausted to drive the turbine 16.

Hot combustion gases 15 exhausted to drive the turbine 16 are typically at temperatures that can potentially damage metal components of the engine 10. An air passage 19 leading from the compressor 12 supplies high-pressure air 18 to the turbine 16. High-pressure air 18 creates a boundary layer that insulates metal components from the hot combustion gases 15 flowing over the turbine 16.

The air 18 within the air passage 19 cooling the turbine 16 must be at a temperature that provides the desired cooling benefits to the turbine 16. The greater the temperature of the air flowing over the turbine 16, the more flow required. More flow from the compressor 12 decreases overall engine efficiencies. For this reason the air 18 within the air passage 19 is first routed through a fuel/air heat exchanger 20. Air 18 within the air passage 19 is placed in thermal contact to reject heat to fuel 22 in the fuel/air heat exchanger 20.

Usable cooling capacity of the fuel 22 is increased by removing dissolved oxygen. The presence of dissolved oxygen within the fuel causes most aircraft fuels to break down at temperatures greater than about 250° F. The breakdown of fuel results in the formation of insoluble coke deposits on components within fuel passages 23 and the combustor 14. The formation of undesirable coke deposits causes degradation of engine efficiencies and/or requires additional maintenance. The fuel system includes a fuel deoxygenator 24 for removing dissolved oxygen from the fuel 22.

Figure 2:
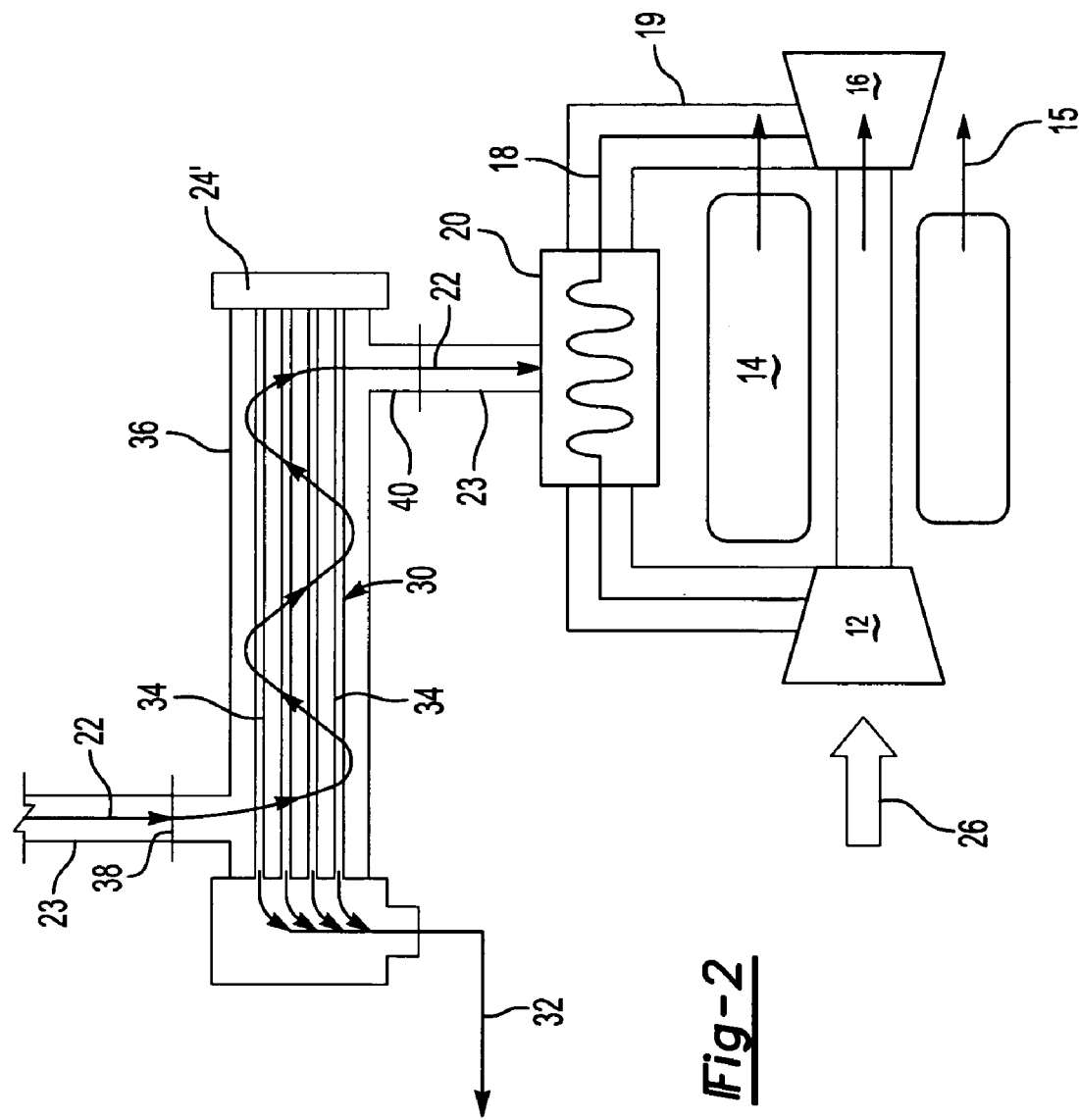
FIG. 2 is a schematic view of a fuel deoxygenator according to this invention.

Referring to FIG. 2, a schematic view of a fuel deoxygenator 24' according to this invention is shown and includes a plurality of tubes 34 disposed within a housing 36. The fuel 22 is flowed around the tubes 34 from an inlet 38 to an outlet 40. Tubes 34 include a composite permeable membrane 30 that absorbs oxygen molecules dissolved within the fuel 22. A strip gas 32 flowing through the tubes 34 creates a partial pressure differential across the composite permeable membrane 30 that draws dissolved oxygen from the fuel 22 into the tubes 34 and out with the strip gas 32. Oxygen is then removed from the strip gas 32 and exhausted from the system. The strip gas 32 is then recycled through the fuel deoxygenator 24'. Deoxygenated fuel exits through the outlet 40 and into the fuel/air heat exchanger 20 for absorbing heat from cooling air 18.

Figure 3:
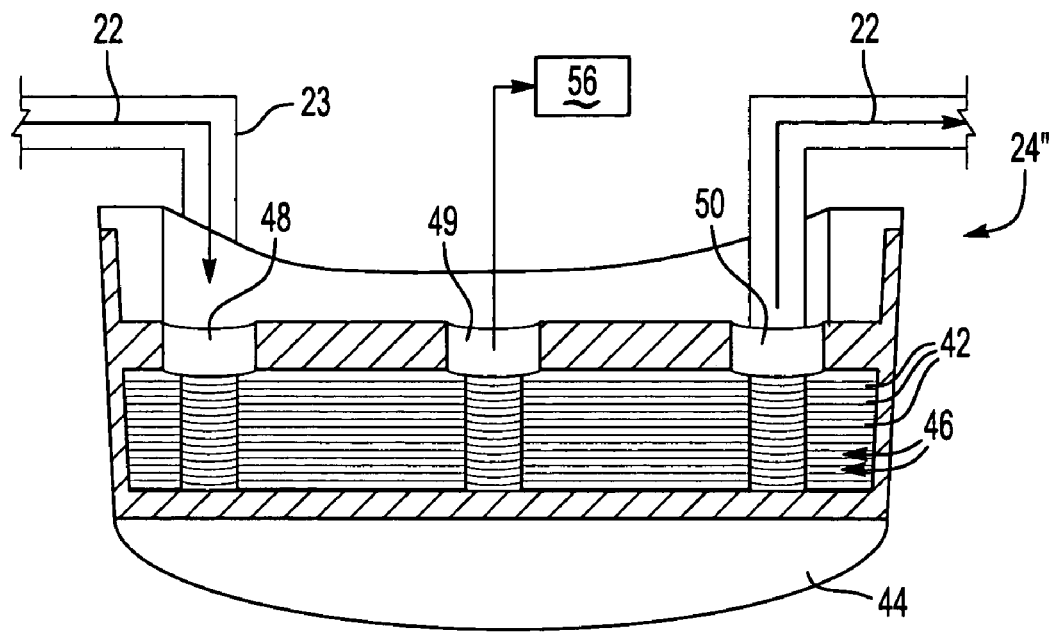
FIG. 3 is a schematic view of another deoxygenator according to this invention.

Referring to FIG. 3, another embodiment of a fuel deoxygenator 24" is shown and includes a series of fuel plates 42 stacked one on top of the other. The composite permeable membrane 30 is included on each of the fuel plates 42 to define a portion of fuel passages 46. Fuel enters through an inlet 48 and exists through an outlet 50. An opening 49 is open to a vacuum source 56. Fuel 22 passes within the fuel passages 46 defined by the stacked fuel plates 42. The fuel plates 42 are disposed within the housing 44 that defines the inlet 48 and the outlet 50. The use of the fuel plates 42 allows for the adaptation of the fuel deoxygenator 24" to various applications by the addition or subtraction of fuel plates 42. Although embodiments of fuel deoxygenators are shown and described, a worker skilled in the art with the benefit of this application would understand that other configurations of fuel deoxygenators are within the contemplation of this invention.

Figure 4:
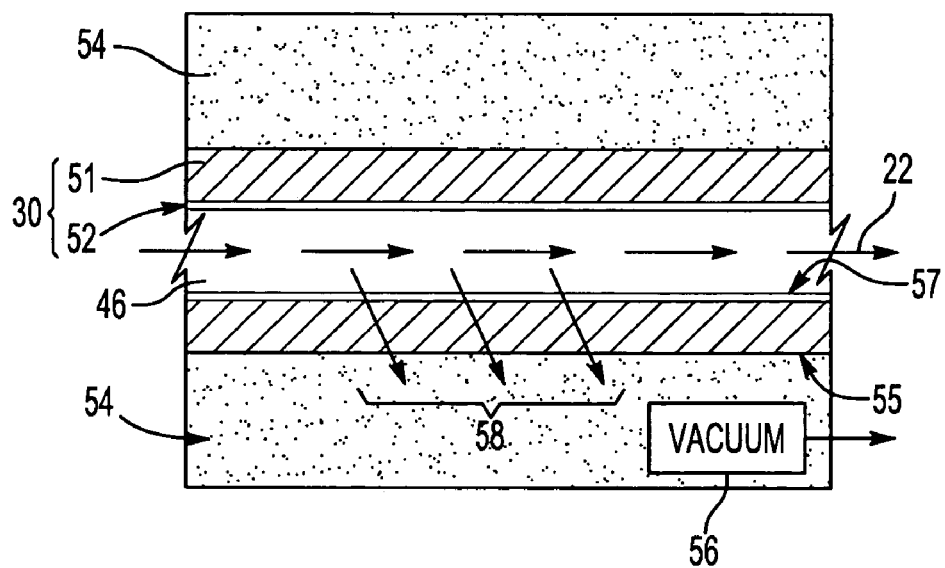
FIG. 4 is a cross-sectional view of a permeable membrane and porous substrate of the fuel deoxygenator.

Referring to FIG. 4, the composite permeable membrane 30 is shown in cross-section and preferably includes a permeable layer 52 disposed over a porous backing 51. The porous backing 51 supplies the required support structure for the permeable layer 52 while still allowing maximum oxygen diffusion from fuel. The permeable layer 52 is coated on to the porous backing 51 and a mechanical bond between the two is formed. The permeable layer 52 is preferably a 0.5–20 μm thick coating of Teflon AF 2400 over a 0.005-in thick porous backing 51 of polyvinylidene fluoride (PVDF) with a 0.25 μm pores size. Other supports of different material, thickness and pore size can be used that provide the requisite strength and openness. Preferably the permeable layer 52 is Dupont Teflon AF amorphous fluoropolymer however other materials known to workers skilled in the art are within the contemplation of this invention, such as Solvay Hyflon AD perfluorinated glassy polymer and Asahi Glass CYTOP polyperfluorobutenyl vinyl ether. Each composite permeable membrane 30 is supported on a porous substrate 54. The porous substrate 54 is in communication with the vacuum source 56 to create an oxygen partial pressure differential across the composite permeable membrane 30.

In operation a partial pressure differential is created by the vacuum source 56 between a non-fuel side 55 of the permeable membrane 30 and a fuel side 57. Oxygen indicated at arrows 58 diffuses from fuel 22 across the composite permeable membrane 30 and into the porous substrate 54. From the porous substrate 54 the oxygen 58 is pulled and vented out of the fuel system.

The efficiency of a gas turbine engine is related to the temperatures that the engine can achieve. Higher temperatures enable better fuel burn capabilities that in turn result in longer range for the aircraft. Increased temperatures are enabled by cooled cooling air 18 from the compressor 12 that is routed through the fuel/air heat exchanger 20. As appreciated, air bled from the compressor 12 reduces the efficiency of the engine 10. The reduction of air bled from the compressor 12 facilitated by the increased heat sink capacity of deoxygenated fuel increases overall engine operating efficiency.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A gas turbine engine assembly comprising:
   a compressor to compress intake air;
   a combustor to combust fuel with compressed intake air;
   a turbine section comprising a rotating turbine in flow communication with said combustor;
   an air passage from said compressor to said turbine for supplying cooling air to said turbine;
   a fuel air heat exchanger for transferring heat from air within said air passage to fuel within a fuel passage; and
   a fuel deoxygenator for removing dissolved gases from said fuel.

2. The assembly of claim 1, wherein said fuel deoxygenator comprises a permeable membrane in contact with fuel flowing through said fuel passages.

3. The assembly of claim 2, comprising a polytetraflouroethylene coating disposed on a fuel side of said permeable membrane.

4. The assembly of claim 2, comprising a porous substrate supporting said permeable membrane on a non-fuel side.

5. The assembly of claim 4, comprising a vacuum source in communication with said porous substrate for creating a partial pressure differential between a fuel side of said permeable membrane and a non-fuel side to draw dissolved gasses out of fuel with said fuel passage.

6. The assembly of claim 4, comprising a strip gas passage in communication with said porous substrate for creating a partial pressure differential between a fuel side of said permeable membrane and a non-fuel side to draw dissolved gases out of fuel within said fuel passage.

7. The system of claim 1, wherein a temperature of fuel within said fuel passage is greater than 325 deg. F.

8. A method of cooling a gas turbine engine comprising the steps of:
   a) directing air from a compressor through an air passage;
   b) removing dissolved gases from within fuel flowing through a fuel passage;
   c) rejecting heat from said air within said air passage to fuel flowing with said fuel passage to produce cooled air; and
   d) flowing cooled air over the engine.

9. The method of claim 8, comprising flowing fuel adjacent a permeable membrane.

10. The method of claim 9, comprising supporting said permeable membrane on a non-fuel side with a porous substrate and creating a partial pressure differential between a fuel side and the non-fuel side of said permeable membrane for driving diffusing gases from fuel.

11. The method of clam 10, comprising creating said partial pressure differential with a vacuum source in communication with said porous substrate.

12. The method of claim 10, comprising flowing a strip gas in communication with said porous substrate for creating said partial differential.

* * * * *